US008929203B2

(12) United States Patent
Ding et al.

(10) Patent No.: US 8,929,203 B2
(45) Date of Patent: Jan. 6, 2015

(54) METHOD AND APPARATUS FOR SUPPORTING MISMATCH DETECTION

(75) Inventors: Zhemin Ding, Stockholm (SE); Panagiotis Saltsidis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 280 days.

(21) Appl. No.: 12/955,796

(22) Filed: Nov. 29, 2010

(65) Prior Publication Data

US 2011/0128861 A1   Jun. 2, 2011

Related U.S. Application Data

(60) Provisional application No. 61/265,042, filed on Nov. 30, 2009.

(51) Int. Cl.
*G01R 31/08* (2006.01)
*G06F 11/00* (2006.01)
(Continued)

(52) U.S. Cl.
CPC .......... *H04L 12/462* (2013.01); *H04L 41/0681* (2013.01); *H04L 43/0811* (2013.01); *H04L 43/0817* (2013.01); *H04L 45/22* (2013.01); *H04L 45/66* (2013.01)
USPC ........... 370/225; 370/217; 370/218; 370/226; 370/227; 370/228

(58) Field of Classification Search
CPC ................. H04L 45/22; H04L 45/28; H04L 41/0663–41/0672; H04L 43/00; H04L 43/06–43/0847; H04L 45/026–45/028
USPC ................. 370/216, 282, 217–218, 225–228, 370/229–253
See application file for complete search history.

(56) References Cited

U.S. PATENT DOCUMENTS 6,147,968 A * 11/2000 De Moer et al. .............. 370/225
6,907,006 B1 * 6/2005 Sakamoto et al. ......... 370/236.2
(Continued)

FOREIGN PATENT DOCUMENTS

WO   2009127931 A1   10/2009

OTHER PUBLICATIONS

IEEE 802.1Qbf/D0.0 "Draft Standard for Local and Metropolitan Area Networks; Virtual Bridged Local Area Networks—Amendment: PBB-TE Infrastructure Segment Protection", LAN/MAN Standards Committee of the IEEE Computer Society, Sep. 16, 2009, pp. 1-42.

(Continued)

*Primary Examiner* — Awet Haile
*Assistant Examiner* — Eric Myers
(74) *Attorney, Agent, or Firm* — Patent Portfolio Builders PLLC (57) ABSTRACT

The present invention relates to a method and a network node for service instance management in telecommunications network. According to the method a plurality of network paths are monitored. A number of network paths form a protection group associated with a service instance or group of service instances. The monitoring of the network paths includes periodic transmission of CCMs on the network paths. To facilitate detection of mismatches related to protection switching, some CCMs include a mismatch information element that specifies traffic status of a working network path and of a protection network path for a set of protection groups. The set of protections groups includes the protection groups which the monitored network path is a member of. A CCM that includes the mismatch information element also includes an indication bit that indicates presence of the mismatch information element in the CCM.

19 Claims, 9 Drawing Sheets

(51) Int. Cl.
  *G08C 15/00* (2006.01)
  *H04J 1/16* (2006.01)
  *H04J 3/14* (2006.01)
  *H04L 1/00* (2006.01)
  *H04L 12/26* (2006.01)
  *H04L 12/46* (2006.01)
  *H04L 12/24* (2006.01)
  *H04L 12/707* (2013.01)
  *H04L 12/721* (2013.01)

(56) References Cited

U.S. PATENT DOCUMENTS

| | | | |
|---|---|---|---|
| 7,093,027 B1 | 8/2006 | Shabtay et al. | |
| 7,839,795 B2 * | 11/2010 | Felkar et al. | 370/245 |
| 8,116,196 B2 * | 2/2012 | Trudel et al. | 370/224 |
| 8,144,576 B2 * | 3/2012 | Saltsidis et al. | 370/228 |
| 8,169,896 B2 * | 5/2012 | Saltsidis et al. | 370/228 |
| 2006/0164996 A1 * | 7/2006 | Meguerditchian | 370/241 |
| 2009/0003313 A1 * | 1/2009 | Busch et al. | 370/352 |
| 2009/0154364 A1 | 6/2009 | Felkar et al. | |
| 2010/0208595 A1 * | 8/2010 | Zhao et al. | 370/242 |

OTHER PUBLICATIONS

IEEE 802.1Qav "IEEE Standard for Local and Metropolitan Area Networks; Virtual Bridged Local Area Networks—Amendment 12: Forwarding and Queuing Enhancements for Time-Sensitive Streams", LAN/MAN Standards Committee of the IEEE Computer Society, Dec. 9, 2009, pp. 1-71.

IEEE 802.1ag "IEEE Standard for Local and Metropolitan Area Networks; Virtual Bridged Local Area Networks—Amendment 5: Connectivity Fault Management", LAN/MAN Standards Committee of the IEEE Computer Society, Sep. 27, 2007, pp. 1-246.

Extended European Search Report mailed May 27, 2013 in related European Application No. 10833670.

Siemens, Metro Ethernet Deployment with Siemens PBB-TE—SURPASS hiD 6600, Mar. 13, 2007, pp. 1-14.

* cited by examiner

METHOD AND APPARATUS FOR SUPPORTING MISMATCH DETECTION

TECHNICAL FIELD

The present invention relates to communication networks, and in particular to methods and arrangements for service instance management that provide support for mismatch detection.

BACKGROUND

Connectivity Fault Management (CFM), as described in IEEE Std 802.1ag-2007, is a key component of operation, administration, and maintenance for carrier Ethernet. IEEE 802.1ag specifies protocols, procedures, and managed objects for end-to-end fault detection, verification, and isolation. IEEE 802.1ag establishes managed objects, called Maintenance Associations (MAs), to verify the integrity of a single service instance by exchanging CFM messages. The scope of an MA is determined by its Management Domain (MD), which describes a network region where connectivity and performance is managed. Each MA associates two or more Maintenance Association Endpoints (MEPs) and enables Maintenance Association Intermediate Points (MIPs) to support fault detection and isolation.

A continuity check protocol is used for fault detection. Each MEP periodically transmits Continuity Check Messages (CCMs) and tracks CCMs received from other MEPs in the same maintenance association.

Provider Backbone Bridging-Traffic Engineering (PBB-TE), as described in IEEE Std 802.1Qay-2009, was designed to provide full traffic engineering of paths in a bridged network. PBB-TE eliminates the need for backbone devices to perform learning and flooding. Instead of using Multiple Spanning Tree Protocol/Rapid Spanning Tree Protocol (MSTP/RSTP) for loop avoidance, PBB-TE uses a management plane or an external control plane to create static filtering table entries in the component bridges.

PBB-TE is a connection-oriented Ethernet technology that uses a statically configured tuple consisting of the ESP Destination Address (ESP-DA), ESP Source Address (ESP-SA), and ESP VLAN ID (ESP-VID) to create a PBB-TE path. The provisioned path is called an Ethernet Switched Path (ESP). Two co-routed point-to-point ESPs with the same Customer Backbone Port (CBP) MAC addresses form a bidirectional MAC service, which is called a point-to-point Traffic Engineering Service Instance (TESI).

PBB-TE supports 1:1 bidirectional path-protection switching. Two point-to-point TESIs are provisioned as a TE protection group (TEPG). One TESI is configured as a "working" TESI and the other as a "protection" TESI. In normal conditions, traffic is transmitted over the working TESI. In the event of either a failure of the working TESI or a specific administrative request, traffic is switched to the protection TESI.

Optionally, PBB-TE 1:1 protected paths may be configured to allow for load sharing. In load sharing mode, the TESIs that are assigned to a TE protection group can be re-used in a number of TE protection groups enabling a list of different backbone service instances to be distributed among a set of interdependent TE protection groups. In other words, in the load sharing mode, a TESI can be a protection TESI in one TE protection group and be a protection or working TESI in another protection group.

Each TESI is monitored by an independent MA, and each MA has two MEPs. One is located in a CBP of the near end; the other is located in a CBP of the far end. When the near end MEP detects the loss of CCMs, it notifies the far end MEP by sending a CCM with a Remote Defect Indicator (RDI) flag. Both ends are aware of the failure (either by loss of CCMs or receiving the CCM with the RDI flag), so protection switching to the protection TESI is executed on both ends. When the failure is cleared, traffic may be switched back to the working TESI or may stay in the protection TESI according to the configured mode (revertive or non-revertive).

Under certain equipment malfunction conditions and/or wrong configuration, a mismatch between mapping of backbone service instances to appropriate TESIs at the terminating CBPs may happen. To maintain the proper operation of the network, this mismatch should be detected and reported to the network operator. Then the network operator can clear the defect. There are two types of mismatch in 1:1 bidirectional protection switching:

Protection switching incomplete mismatch; and
Working/protection configuration mismatch.

Protection switching incomplete mismatch may occur e.g. if the near end, due to a hardware malfunction, fails to switch over, but sends an RDI to the far end. The far end switches to the protection TESI while the near end is still in the working TESI. Similarly, a mismatch can also occur when the near end switches to the protection TESI, but the far end fails to switch when it receives the RDI.

A mismatch can also occur because of a wrong configuration. For example, one end may be configured to send traffic on the working TESI while the other end is configured to send traffic on the protection TESI. Similarly, one end may be configured in the revertive mode while the other end is configured in the non-revertive mode. In this case, the mismatch occurs when a failure is cleared.

PBB-TE supports protection of a group of TESIs traversing a common sequence of Provider Network Ports (PNPs). Such a sequence of PNPs, together with the intervening Bridge relays and LANs is called an infrastructure segment or sometimes simply a segment. The group of TESIs is protected from a connectivity failure occurring anywhere along the infrastructure segment, inclusive of the endpoint PNPs. The method of protection does not affect portions of the TESIs lying outside the segment; that is, the scope of protection is limited to the specified segment. This type of protection is called Infrastructure Segment Protection, which is specified in IEEE P802.1Qbf/D0.0.

There are two types of Infrastructure Protection Switching (IPS): 1:1 IPS and M:1 IPS. In 1:1 IPS a working segment and an associated protection segment are said to form an infrastructure protection group (IPG). In M:1 IPS additional protection segments are provided. Each such additional protection segment is called an alternate protection segment. An alternate protection segment can assume the role of the protection segment if connectivity failure of the protection segment has been detected. M:1 IPS requires that all segments associated with the IPG are mutually disjoint. Each provisioned Alternate Protection Segment is assigned a selection priority unique within the IPG. On detection of a failure associated with the protection segment, the role of the protection segment is assumed by the alternate protection segment having the highest (lowest numeric) priority and for which a connectivity failure has not been detected.

PBB-TE Infrastructure Segment Protection also supports load sharing mode in a manner similar to the TESI protection switching, enabling a segment to be associated with more than one IPG. For example, the operator may designate a Segment 1 as the working segment of an IPG1 and a Segment 2 as the protection segment of the IPG1. The operator may concurrently designate the Segment 2 as the working segment of an IPG2 and the Segment 1 as the protection Segment of the IPG2. In this case, the same MA provides monitoring of the Segment 1 in the IPG1 and in the IPG2.

The international patent application WO2009/127931 suggests using a traffic field in CCMs to indicate traffic status, e.g. whether traffic is transmitted in the TESI monitored by the CCMs. If the traffic field of received and transmitted CCMs of a MEP does not match for a predetermined period of time a mismatch is detected. However, the traffic field supported in PBB-TE MEPs may not be sufficient to detect a mismatch defect in a load sharing mode of PBB-TE 1:1 bidirectional path protection switching or PBB-TE Infrastructure Segment Protection. The traffic field can indicate whether or not there is traffic on a specific TESI or infrastructure segment, but in case of load sharing the traffic on the TESI of infrastructure segment may be associated with several different TE protection groups or infrastructure protection groups.

SUMMARY

An object of the present invention is to provide a method and apparatus for service instance management that provide support for mismatch detection.

The above stated object is achieved by means of a method and a network node according to the independent claims.

A first embodiment provides a method for service instance management in a first network node of a communication network. The method comprises monitoring a plurality of bidirectional and distinct network paths for carrying a number of service instances from the first network node to a second network node. The network paths form a protection group associated with a respective service instance or group of service instances. The monitoring of the network paths includes continuously and periodically sending Continuity Check Messages (CCMs) on a monitored network path to the second network node. In response to occurrence of a predetermined event, an indication bit is included in the CCMs, which are sent on the monitored network path for a predetermined first period of time after the occurrence of the predetermined event. The indication bit indicates presence of a mismatch information element in the CCM that includes the indication bit. The mismatch information element includes information that specify, for each protection group that the monitored network path is a member of, traffic status of a working network path and of a protection network path of the protection group.

A second embodiment provides a network node for use in a communication network. The network node comprises a number of Operation, Administration and Management, OAM, entities configured to monitor a plurality of bidirectional and distinct network paths for carrying a number of service instances from the network node to another network node. The network paths form a protection group associated with a respective service instance or group of service instances. The OAM entities are configured to continuously and periodically send Continuity Check Messages (CCMs), on a monitored network path to the other network node. The OAM entities are further configured to, in response to occurrence of a predetermined event, include an indication bit in the CCMs, which are sent on the monitored network path for a predetermined first period of time after the occurrence of the predetermined event. The indication bit indicates presence of a mismatch information element in the CCM that includes the indication bit. The mismatch information element includes information that specify, for each protection group that the monitored network path is a member of, traffic status of a working network path and of a protection network path of the protection group.

An advantage of some embodiments described herein is that they provide improved possibilities for mismatch detection in load sharing mode.

Another advantage is that embodiments presented herein provide a simple CCM enhancement based on existing hardware architecture, with little impact on existing standards.

A further advantage is that certain embodiments avoid increasing complexity of CCM processing by limiting transmission of the mismatch information element to a limited period of time after occurrence of a predetermined event that might cause a mismatch. The indication bit that is used to indicate presence of the mismatch information element in the CCM can be generalized to indicate that there is a special TLV attached to the CCM for future CCM extension.

Yet another invention is that some embodiments presented are applicable to both PBB-TE and PBB-TE infrastructure segment protection Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 1A:
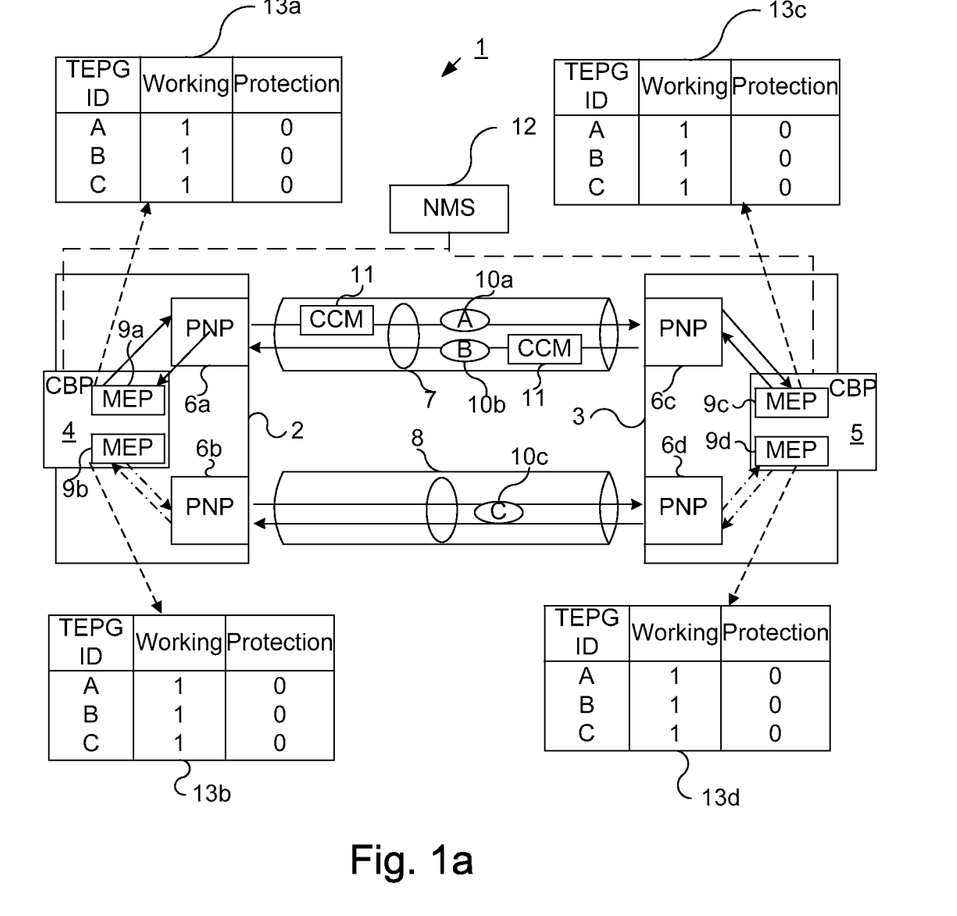
FIGS. 1a and 1b are schematic block diagrams illustrating a PBB-TE configuration according to an embodiment under normal operation and in a mismatch situation respectively.

FIG. 1 illustrates a part of a communication network 1 including a Provider Backbone Bridging-Traffic Engineering (PBB-TE) configuration for transporting traffic between a far end (also referred to as West B-Component) 2, and a near end (also referred to as East B-Component) 3. The far end 2 includes a Customer Backbone Port (CBP) 4 and Provider Network Ports (PNPs) 6a and 6b. The near end 3 includes a CBP 5 and PNPs 6c and 6d. There are two distinct and bidirectional network paths illustrated between the near 3 and the far end 2 in the form of a first and a second Traffic Engineering Service Instance (TESI) 7 and 8. Each TESI is monitored by an independent Maintenance Association MA, and each MA has two MEPs. One is located in the CBP 4 of the far end; the other is located in the CBP 5 of the near end. Thus the CBP 4 is illustrated to include a MEP 9a associated with the first TESI 7 and a MEP 9b associated with the second TESI 8, while the CBP 5 is illustrated to include a MEP 9c associated with the first TESI 7 and a MEP 9d associated with the second TESI 8. FIG. 1a illustrates a load sharing mode. Traffic related to services instances 10a, 10b and 10c, which in this example are backbone services, is carried on the TESIs 7 and 8. The TESIs 7 and 8 form Traffic Engineering (TE) protection groups associated with the respective backbone services. It is assumed in this example that A, B and C are used as protection group identities to refer to the respective protection groups associated with the respective backbone services 10a, 10b and 10c. In the TE protection group A the first TESI 7 is the working TESI and the second TESI 8 is the protection TESI. In the TE protection group B, the first TESI 7 is the working TESI and a third TESI (not illustrated for simplicity) is the protection TESI and in the TE protection group C, the second TESI 8 is the working TESI and a fourth TESI (not illustrated for simplicity) is the protection TESI. In FIG. 1a normal operation is illustrated, which implies that the first TESI 7 carries traffic related to the TE protection groups A and B, corresponding to the backbone services 10a and 10b respectively while the second TESI carries traffic related to the TE protection group C, corresponding to the backbone service 10c.

Each MEP 9a-d periodically transmits Continuity Check Messages (CCMs) 11 and tracks CCMs received from other MEPs in the same maintenance association. If a e.g. the near end MEP 9b detects loss of CCMs 11, it notifies the far end MEP 9a by sending a CCM with a Remote Defect Indicator (RDI) flag. Both ends are aware of the failure (either by loss of CCMs or receiving the CCM with the RDI flag), so protection switching to the protection TESI is thereafter to be executed on both ends. Since the first TESI is the working TESI for both TE protection group A and TE protection group B in this load sharing example, both protection groups A and B should switch to their respective protection TESIs. When the failure is cleared, traffic may be switched back to the first TESI 7 or may stay in the protection TESI(s) according to the configured mode (revertive or non-revertive) of the respective protections groups A and B.

As mentioned above there are different types of mismatches that may occur in 1:1 bidirectional protection switching. An example of protection switching incomplete mismatch is described in FIG. 1b. In this example, due to certain hardware malfunction, the near end 3 fails to switch over TE protection group A to the protection TESI but it sends an RDI 14 to the far end 2. The far end switches to the protection TESI for TE protection group A, while the near end is still in the working TESI. Similarly a mismatch can also happen when the near end 3 switches to the protection TESI but the far end 2 fails to switch when it receives the RDI. It is desirable to detect and report any mismatch to an operator or a Network Management System NMS (12) as soon as possible.

A mismatch can also happen because of wrong configuration. For example, one end is configured to send traffic on the working TESI while the other end is configured to send traffic on the protection TESI. Another situation in which a mismatch may arise is where one end is configured as revertive mode while the other end is configured as non-revertive mode. The mismatch occurs when a failure is cleared.

Figure 1B:
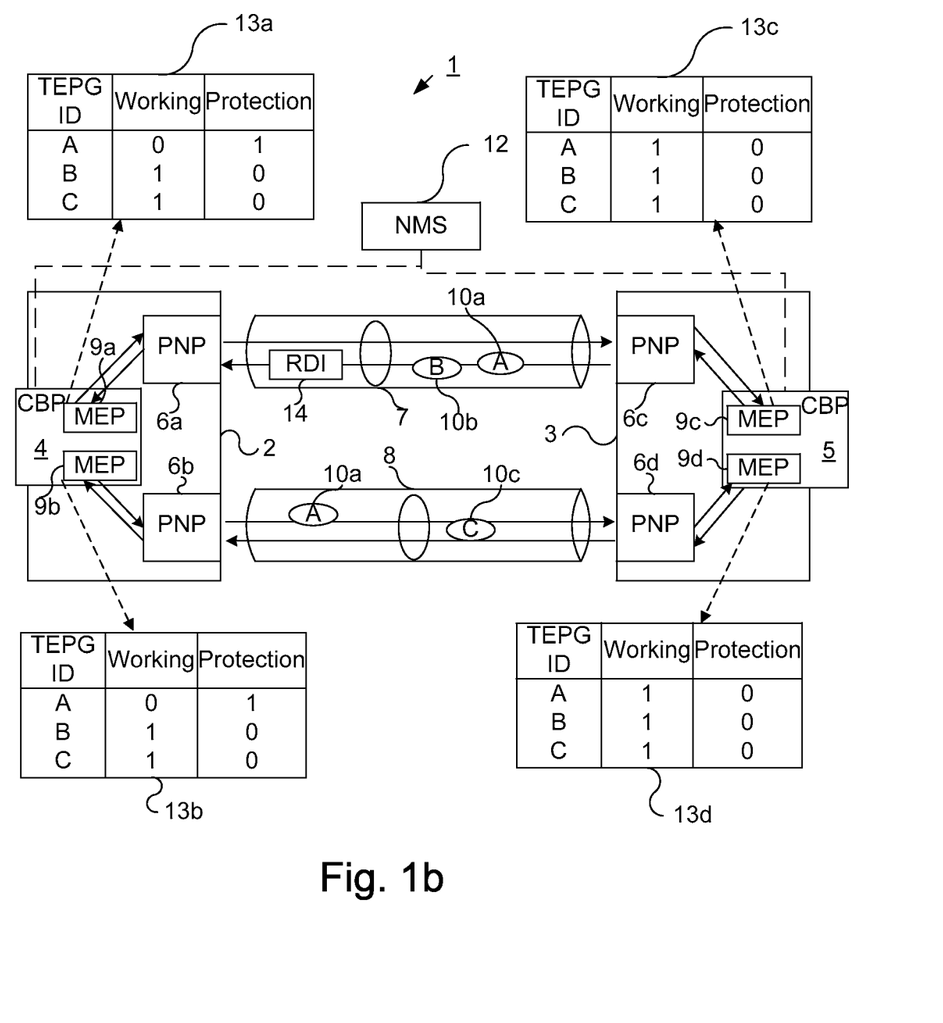

If the MEPs 9a-d support the above mentioned traffic field of CCMs, the mismatch can be detected in a non-shared mode of operation. The traffic field may be one of four reserved bits in a flags field of the CCM. This bit indicates traffic status, i.e. whether or not traffic is transmitted in the TESI monitored by the CCM. The mismatch is detected in one of the MEPs when the traffic field of transmitted CCMs and received CCMs do not match for a period of time (e.g. 50 ms or longer). The mismatch defect is cleared when the corresponding MEP receives the first CCM which indicates the same traffic field as CCMs transmitted from the MEP.

Figure 2A:
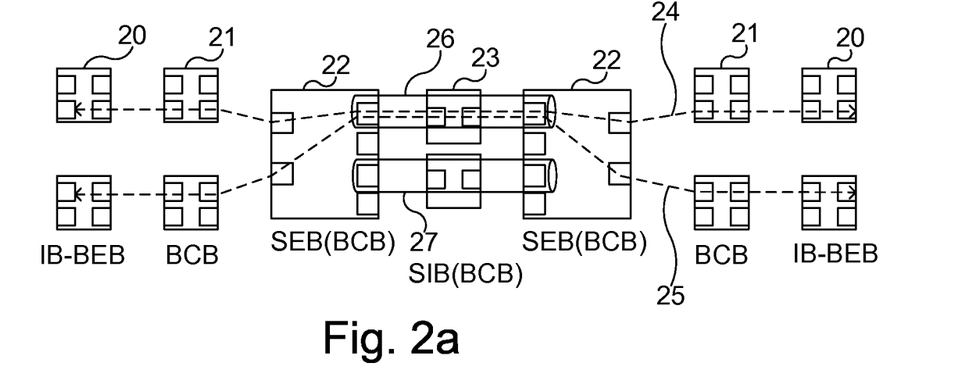
FIG. 2a and FIG. 2b are schematic block diagrams illustrating a PBB-TE infrastructure segment protection configuration under normal operation and in a protection mode respectively.
Figure 2B:
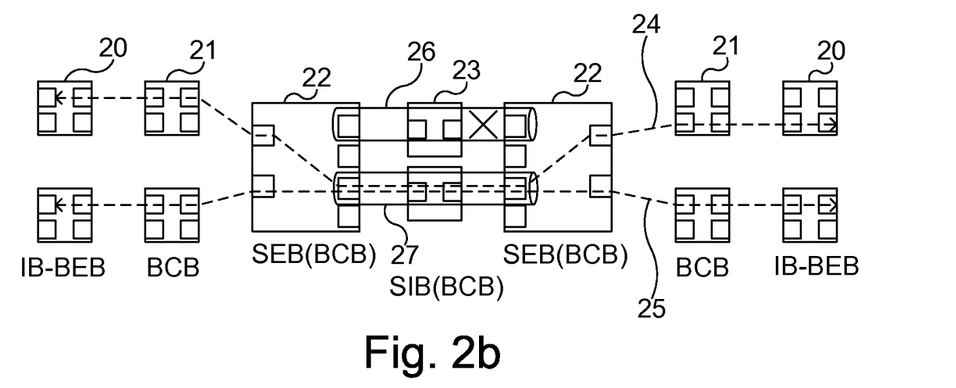

FIGS. 2a and 2b are schematic block diagrams illustrating 1:1 Infrastructure Protection Switching (IPS), where a segment is terminated on PNP ports of Backbone Core Bridges (BCBs) 22. The BCBs 22 are called Segment Endpoint Bridges (SEBs) and a bridge 23 in the interior of the segment is called a Segment Intermediate Bridge (SIB). BCBs 21 exterior of the segment and IB Backbone Edge Bridges (IP-BEBs) 20 are also illustrated in FIGS. 2a and 2b. A TESI 24 and a TESI 25 traverse a working segment 26 under normal operation as illustrated in FIG. 2a. A protection segment 27 is provided to allow for protection switching of the TESIs 24, 25. The working segment 26 and the protection segment 27 are disjoint but terminate in the same pair of SEBs 22. The working segment 26 and the associated protection segment 27 are said to form an Infrastructure Protection Group (IPG).

On detection of a connectivity failure on the working segment 26 or as a result of an administrative command, the SEBs 22 redirect TESIs 24, 25 associated with the working segment 26 to the protection segment 27 as shown in FIG. 2b.

Figure 3:
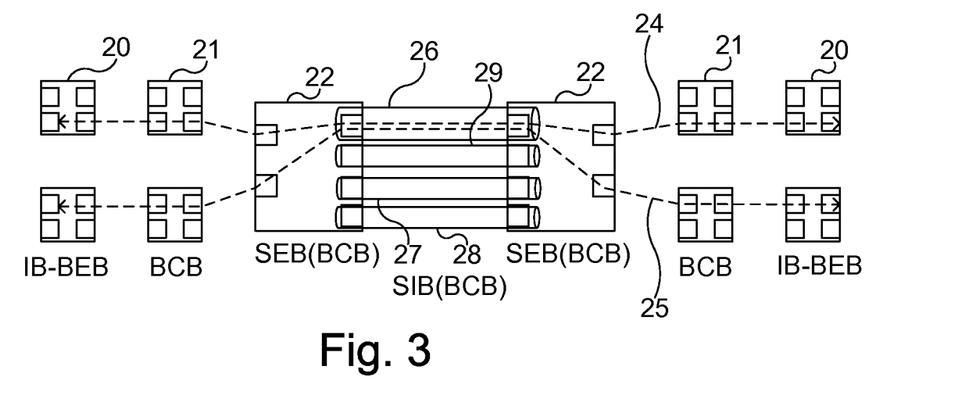
FIG. 3 is a schematic block diagram illustrating a M:1 Infrastructure Protection Switching configuration.

An example of M:1 IPS is shown in FIG. 3. The elements illustrated in FIG. 3 correspond to the elements illustrated in FIGS. 2a and 2b with the addition of alternate protection segments 28 and 29. Each provisioned alternate protection segment is assigned a selection priority within the IPG. On detecting a failure associated with the protection segment 27, the role of the protection segment is assumed by the alternate protection segment 28 or 29 having the highest (lowest numeric) priority and for which a connectivity failure has not been detected.

The inventors have realized that the above mentioned traffic field supported in PBB-TE MEPs may not suffice for detecting mismatches in the load sharing mode of PBB-TE 1:1 bidirectional path protection switching or PBB-TE Infrastructure Segment Protection.

In the load sharing mode of PBB-TE 1:1 bidirectional path protection switching, TESIs assigned to a TE protection group can be re-used in other TE protection groups. This makes the use of the traffic field insufficient to detect mismatch defects as it can only indicate if there is traffic on a specific TESI and the presence or not of traffic on the TESIs that are shared amongst a set of TE protection groups is not directly associated with the proper operation of the protection switching mechanisms. The same holds true in the load sharing mode of PBB-TE Infrastructure Segment protection since the traffic field can only tell if there is traffic on a specific Segment but fails to associate this traffic to the IPG that the traffic belongs to.

For example, as in FIG. 1a, under normal operation, there is always traffic going through the first TESI 7 and the second TESI 8, so the traffic field will be always set by the MAs monitoring those TESIs. Therefore the mismatch situation described above and illustrated in FIG. 1b cannot be detected by the MAs merely by monitoring the traffic field of the CCMs 11 on the TESIs 7 and 8, because the traffic fields from CCMs 11 in both directions are always set. More specifically in FIG. 1b, the traffic field of CCMs in the first TESI 7 is always set because the first TESI 7 is still working TESI of TE protection group B and the traffic field of CCMs in the second TESI 8 is always set because the second TESI 8 is still working TESI of TE protection group C.

Figure 4A:
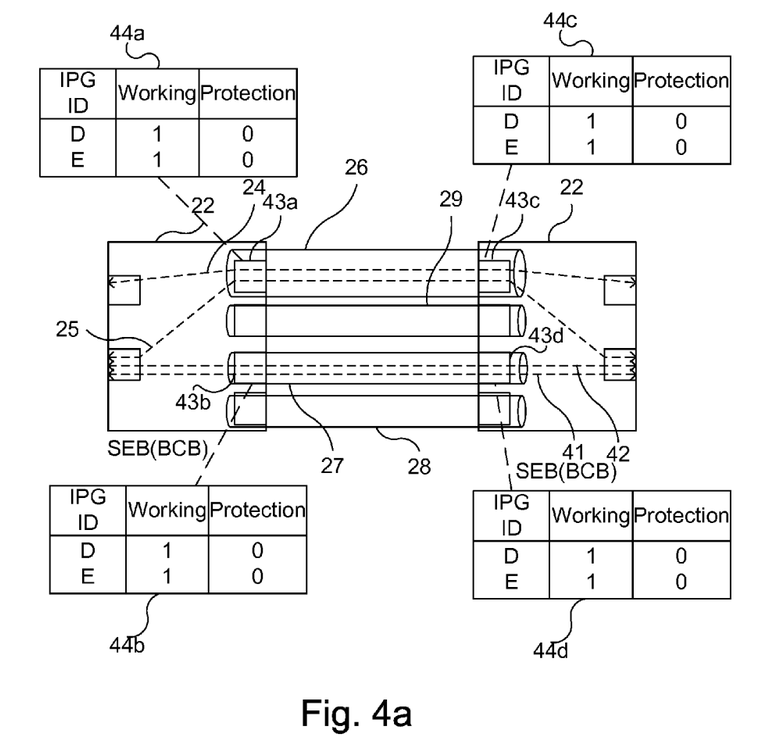
FIGS. 4a and 4b are schematic block diagrams illustrating a subsection of the M:1 Infrastructure Protection Switching configuration of FIG. 3 under normal operation and in a mismatch situation according to an embodiment.
Figure 4B:
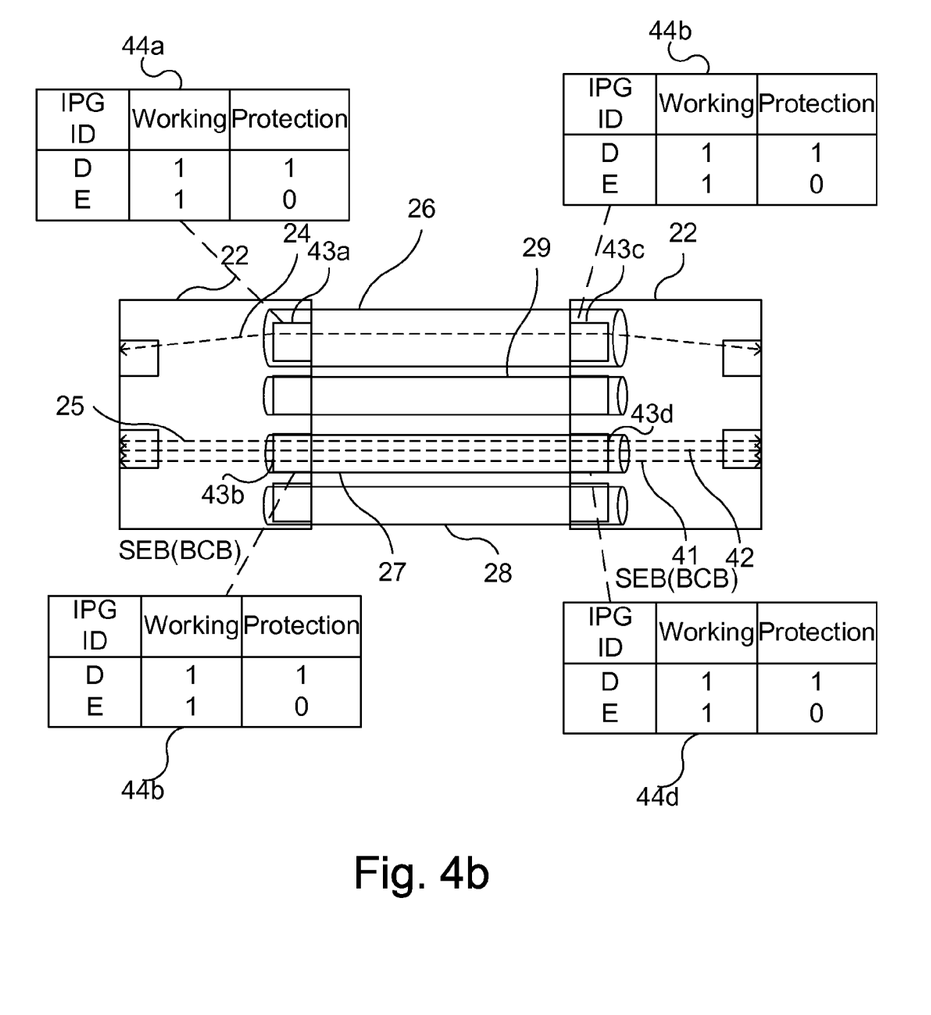

FIGS. 4a and 4b illustrate an example of load sharing mode of PBB-TE Infrastructure Segment Protection under normal operation and in a mismatch situation respectively. Under normal operation as illustrated in FIG. 4a an IPG D, which includes TESIs 24 and 25, traverses the segment 26 which is the working segment of the IPG D. The IPG D is protected by its protection segment which is the segment 27. An IPG E, which includes TESIs 41 and 42, traverses the segment 27, which is the working segment of the IPG E. The IPG E is protected by the segment 26, which is the protection segment of the IPG E. Thus, under normal operation, as there is always traffic going through the segment 26 and the segment 27, the traffic field will be always set by MEPs 43a, 43b, 43c and 43d monitoring the segments 26, 27.

Now, assume that there is an administrative command that dictates that all the TESIs 24, 25 of the IPG D in the segment 26 should be switched to the protection segment, i.e. to the segment 27. Due to a configuration error, only the TESI 25 is switched to IPG D protection segment and the TESI 24 still stays in IPG D working segment as illustrated in FIG. 4b. Accordingly there is a mismatch in this scenario since there will be traffic associated with the IPG D on both the working TESI and on the protection TESI. However, traffic field monitoring in segment monitoring MAs can not detect the mismatch because the traffic fields from CCMs in both directions are always set.

In M:1 Infrastructure Protection, both ends must have the same priority order for alternate protection segments to avoid possible mismatches. If there is a configuration error of the priority order, the configuration error cannot be detected based on previously known mismatch detection mechanisms such as the traffic field. For example, as in FIGS. 4a and 4b, assume that alternate protection segments 28 and 29 are configured for the IPG D. Assume further that the priority order is configured as 0 for the segment 28 and 1 for the segment 29 in the SEB 22 on one end, and in the SEB 22 on the other end, the priority order is configured as 1 for the segment 28 and 0 for the segment 29. If there is a connectivity failure on the protection segment (segment 27) of the IPG D, one end SEB 22 will pick the segment 28 as protection segment and the other end SEB 22 will pick the segment 29 as protection segment. This configuration error will not be detected until there is a connectivity failure on the working segment (segment 26). As one end SEB 22 switches related TESIs to the segment 28 and the other end SEB 22 switches related TESIs to the segment 29, there will be a mismatch error. However, as we point out in the previous examples, it may not be possible to detect this mismatch if PBB-TE Infrastructure Segment Protection is in load sharing mode.

As illustrated by the examples above the traffic field is not enough for mismatch detection in the load sharing mode for PBB-TE 1:1 bidirectional path protection or PBB-TE Infrastructure Segment Protection. It would therefore be desirable to have another mechanism, preferably based on the existing bridge architecture, for monitoring working/protection entities that allow immediate reporting of mismatches to operators.

Embodiments described in more detail below use a bit in a CCM as an indication bit, which indicates a mismatch information element in the CCM. The indication bit may e.g. be a bit in a CCM flags field and the mismatch information element may e.g. be a mismatch type-length-value (TLV). The mismatch information element is defined to specify traffic status for different TE protection groups for a specific TESI or different infrastructure protection groups for a specific segment. Other configuration parameters can optionally also be included to coordinate both ends.

According to embodiments described herein the indication bit is set in response to occurrence of a predetermined event and for a configurable period of time (herein referred to as a first period of time) after occurrence of the predetermined event. In some exemplary embodiments the indication bit is only set when there is a new state transition in a protection switching state machine and only for a limited period of time (i.e. first period of time) after the state transition to avoid slowing down normal CCM processing.

Figure 9A:
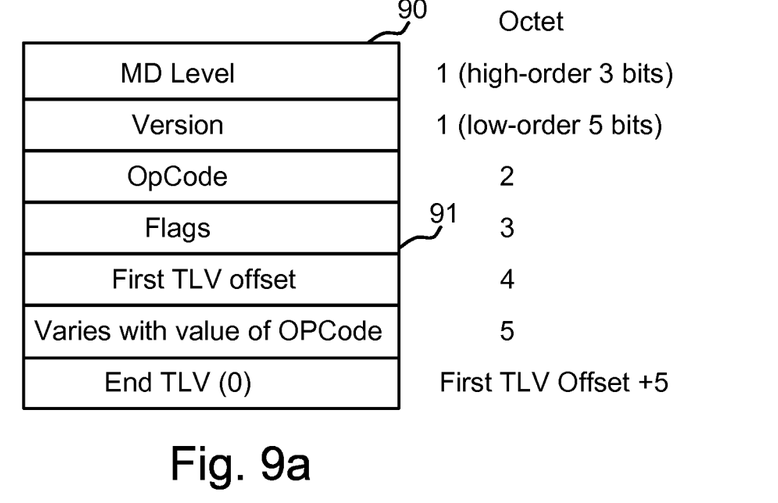
FIGS. 9a, 9b and 9c are schematic block diagrams illustrating a CFM header format, a format of a Flags field of a CCM, and a format of a mismatch TLV according to exemplary embodiments presented herein.
Figure 9B:
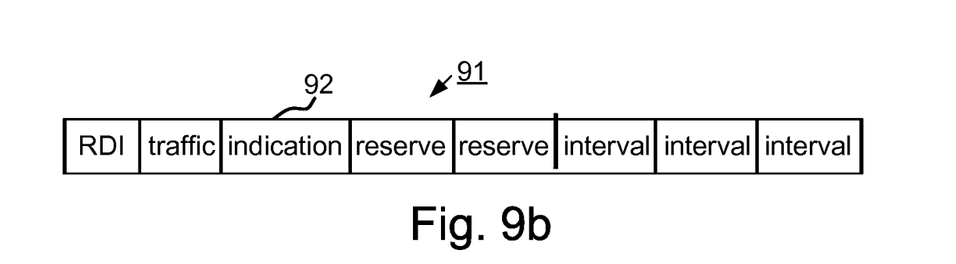

FIG. 9a is a schematic block diagram of a header format of a CFM protocol data unit (PDU) comprising MD level, version, OpCode, flags 91 and first TLV Offset fields. FIG. 9b is a schematic block diagram of the flags field 91 of a CCM PDU according to an exemplary embodiment. In this exemplary embodiment a bit in the flags field 91 is used as the indication bit 92 for indicating whether the mismatch information element is included in the CCM. According to the current standard there are a number of reserved bits in the flags field 91 and according to this exemplary embodiment one of those reserved bits is used as the indication bit 92.

As mentioned above the mismatch information element should be defined to specify the traffic status for different TE protection groups (TEPGs) for a specific TESI or different Infrastructure Protection Groups (IPGs) for a specific Segment. The mismatch information element should, according to certain embodiments, be added to the CCM only when the state machine initializes or there is an event that triggers switching of traffic from one path to another, in other words in connection with a state transition in the state machine. The mismatch information element may be added to the CCMs that monitor the corresponding network path for the limited period of time (i.e. the first period of time) to avoid slowing down normal CCM processing. There is one set of protection switching state machine per protection group on each bridge that terminates the protection group. Accordingly the state machine is located in the nodes/bridges 2, 3 and 22 of FIGS. 1-4 described above. In IEEE standards, the state machine usually includes states like Initiation, Working TESI/Segment Failure, Protection TESI/Segment Failure, etc. Accordingly a state transition generally implies that something happens to the network path or that the network operator wants to change the traffic path. If there are no failures and no reconfiguration by administrative commands, there will be no state transition. When the state machine initializes or there is a new state transition in the state machine, for example, BEGIN→Working or Working→Protection, the mismatch information element may be added to CCMs and the corresponding indication bit is set. The rationale is that a mismatch error usually takes place when there is a state transition. Thus there is generally no need to monitor mismatches by means of the mismatch information element all the time. Instead, it is generally sufficient to check if there is a protection switching incomplete mismatch or a configuration mismatch as soon as there is a state transition. We also do not need to run CCMs with the mismatch information element all the time after the state transition. A limited period of time (herein referred to as the first period of time) can be configured which is considered appropriate and sufficient for detection of any mismatch in connection with the state transition. This first period of time may e.g. be 50 ms or longer and may be monitored by a mismatch information timer.

Figure 9C:
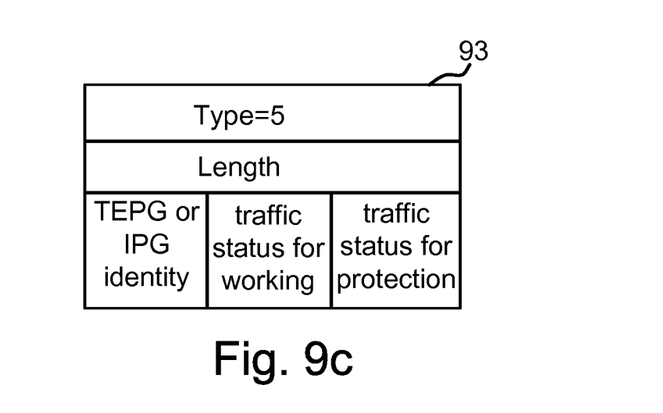

A format of an exemplary embodiment of a mismatch information element 93 is illustrated in FIG. 9c. The mismatch information element 93 of FIG. 9c is a mismatch TLV defined based on the data structure in the standard IEEE Std 802.1Qay-2009 or the standard document IEEE P802.1Qbf/ D0.0 to facilitate modification of those standards to comply with embodiments described herein.

According to a modified version of the standard IEEE 802.1Qay the mismatch TLV 93 carries a list of traffic engineering protection groups (TEPGs) to which the TESI monitored by the CCM is assigned. Each entry in the list contains the following elements associated with the TEPG:

the identity of the TEPG
the traffic status for the working TESI in the TEPG, in other words, whether this working TESI is active with traffic from this TEPG. If it is active, traffic status=1, if it is not active, traffic status=0.
the traffic status for the protection TESI in the TEPG, in other words, whether this protection TESI is active with traffic from this TEPG.

If it is active, traffic status=1, if it is not active, traffic status=0. The identity of the TEPGs should be unique within the shared protection groups and both TESI end points should share the same understanding on the identity of the shared protection groups. One possible idea is to use the combination of working TE-SID and protection TE-SID to uniquely identify one TEPG but any other identifier that satisfies the condition above is appropriate.

In FIG. 1a mismatch information elements 13a, 13b, 13c and 13d are shown to schematically illustrate the content of mismatch information elements that would be transmitted in CCMs from the respective MEPs 9a-d under normal operation of the exemplary configuration illustrated in FIG. 1a. For simplicity reasons, the identities of the TEPGs are represented here by letters.

According to a modified version of the standard IEEE 802.1Qbf the mismatch TLV 93 carries a list of IPGs to which the segment monitored by the CCM is assigned. Each entry in the list contains the following elements associated with the IPG:

the identity of the IPG
the traffic status for the working segment in the IPPG, in other words, whether this working segment is active with traffic from this IPG. If it is active, traffic status=1, if it is not active, traffic status=0.
the traffic status for the protection segment in the IPG, in other words, whether this protection segment is active with traffic from this IPG.

If it is active, traffic status=1, if it is not active, traffic status=0.

The identity of the IPGs should be unique within the shared protection groups and both SEBs should share the same understanding on the identity of the shared protection groups. One possible idea is to use the combination of Working Segment MAID and Protection Segment MAID to uniquely identify one IPG but any other identifier that satisfies the condition above is appropriate.

In FIG. 4a mismatch information elements 44a, 44b, 44c and 44d are shown to schematically illustrate the content of mismatch information elements that would be transmitted in CCMs from the respective MEPs 43a-d under normal operation of the exemplary configuration illustrated in FIG. 4a. For simplicity reasons, the identities of the IPGs are represented here by letters.

According to certain exemplary embodiments, whenever CCMs are sent by the MEPs, the following operations may be performed:

The MEP checks if there is a state machine transition or if a mismatch TLV timer is expired for all shared TEPGs or shared IPGs associated with the MEP. If there is a state transition or the mismatch TLV timer is still running for any of those TEPGs or IPGs associated with the MEP, the MEP performs the following
a. Set the protocol version in the CCM to version 2. (In version 1, the reserved bits in the flags field 91 are ignored.)
b. Set the "Indication Field" 92 in the CCM to "true".
c. Add the mismatch TLV with the appropriate value to the CCM.

The "Mismatch" TLV is constructed based on information configured by operators. A mismatch is detected if
Both Traffic Status for Working and Traffic Status for Protection field are the same for a specific TEPG or IPG.

Whenever CCMs are received by the MEPs, the following operation may be performed by the respective MEP:
Compare any received mismatch TLV against the MEPs own current mismatch TLV. If it is different for a period of time (herein referred to as a second period of time, e.g. 50 ms, a mismatch defect is declared.

For example, the mismatch situation illustrated and described in connection with FIG. 1b can be detected by means of the mismatch information elements 13a-d, which in FIG. 1b are illustrated with contents corresponding to the mismatch situation. In this case, the mismatch will be detected when one MEP receives mismatch information elements and finds that the received mismatch information elements are different from the MEP's own transmitted mismatch information elements during the second period of time. The MEP 9a may for instance detect the mismatch by comparing the mismatch information element 13c received in a CCM from the MEP 9c with the mismatch information element 13a which the MEP 9c transmits on the TESI 7. The comparison shows differing traffic status for the working and protection TESIs of the TEPG A, which indicates the mismatch. The mismatch may also be detected by corresponding comparisons in the MEPs 9b, 9c and 9d.

The exemplary mismatch situation illustrated and described in connection with FIG. 4b can be detected by means of the mismatch information elements 44a-d, which in FIG. 4b are illustrated with contents corresponding to the mismatch situation. In this case, the mismatch will be detected in the MEPs 43a-d since the for IPG D, both working segment and protection segment are active with traffic as indicated by the traffic status for IPG D in the mismatch information elements 44a-d. Thus this kind of configuration mismatch can be detected.

If there is a configuration error of the priority order for alternate protection segments in M:1 Infrastructure Protection, this mismatch may be detected when there is a connection failure on the original protection segment. If the identity of IPG includes MAID of the protection segment, this specific IPG identity will be different between both ends mismatch information element.

The proposed indication bit can be used whenever the CCM needs to be checked more thoroughly. In addition to indicate that there is a mismatch information element included in the CCM, the indication bit can be extended to indicate that there is a special information element (e.g. TLV) attached to the CCM for future CCM extension.

Figure 5:
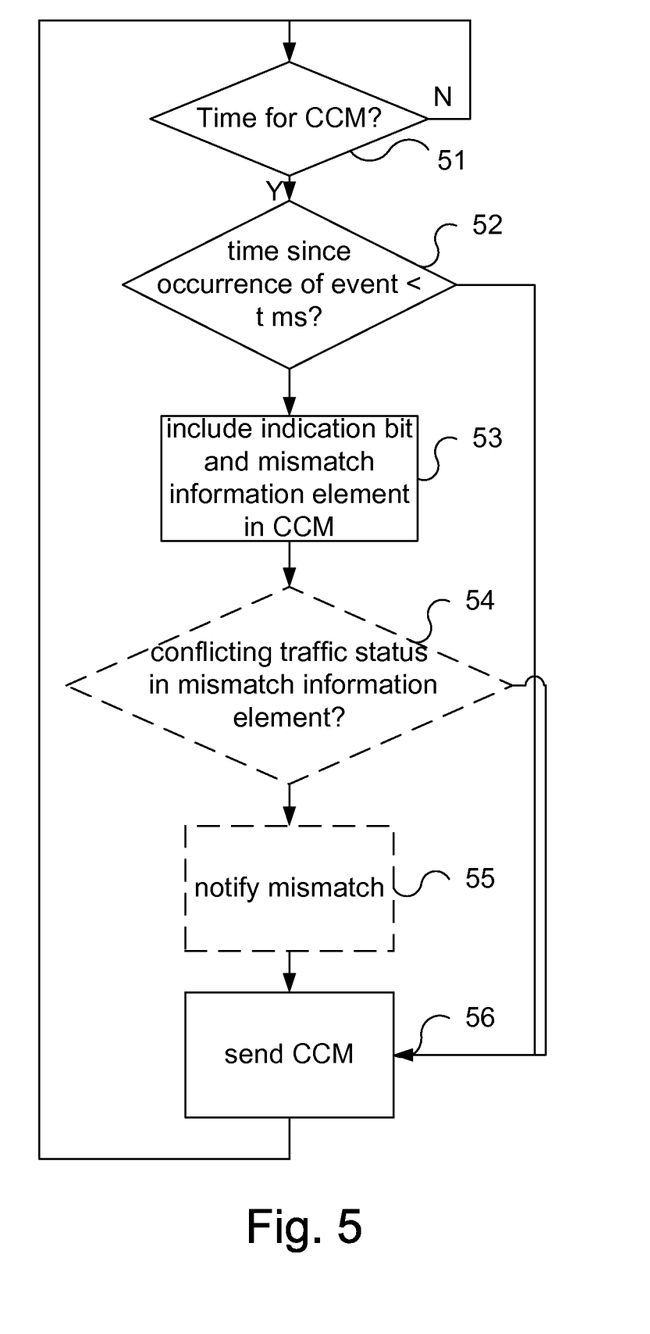
FIG. 5 is a flow diagram illustrating an embodiment of a method for service instance management that provides support for mismatch detection.

FIG. 5 is a flow diagram illustrating an exemplary embodiment of a method for service instance management in a network node such as one of the illustrated bridges/nodes 2, 3 or 22. The method comprises monitoring a plurality of bidirectional and distinct network paths carrying a number of service instances from the network node to another network node. The network paths may for instance be TESIs carrying a number of backbone service instances or infrastructure segments carrying a number of TESIs. The network paths form one or several protection groups associated with a respective service instance or group of service instances. The monitoring of the network paths includes periodic transmission of CCMs on a monitored network path. More specifically and as illustrated in FIG. 5 it is determined in a step 51, whether it is time to send a CCM. When it is time to send a CCM it is investigated if a predetermined event has occurred and if the time since such a predetermined event was less than a predetermined time t ms ago, step 52. The predetermined event may e.g. be a state transition in the protection switching state machine and time t (referred to the first period of time above) may e.g. be 50 ms as discussed above. If the determination in a step 52 is affirmative the indication bit and mismatch information element is to be included in the CCM, step 53, otherwise the CCM is to be sent without the indication bit and the mismatch information element in a step 56. As discussed above the mismatch information element includes information that specifies, for each protection group that the monitored network path is a member of, traffic status of a working network path and of a protection network path. In an optional step 54 the mismatch information element of the CCM to be sent, may be examined to determine if there is any conflicting traffic status of the working path and of the protection path of any protection group included in the mismatch information element. If such a conflicting traffic status is detected an operator or NMS is notified that a mismatch has been detected in a step 55. The CCM is sent in a step 56. The step 56 may also be performed prior to the optional steps 54 and 55.

Figure 6:
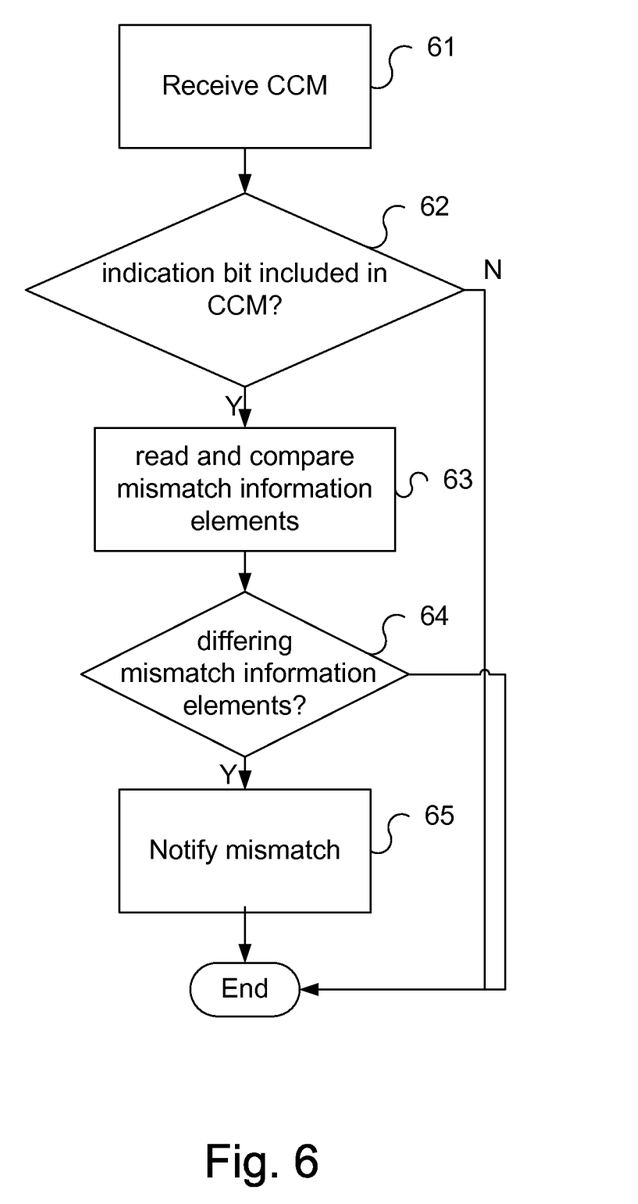
FIG. 6 is a flow diagram illustrating an alternative embodiment of a method for service instance management that provides support for mismatch detection in a received CCM.

An exemplary embodiment of a method for service instance management in a network node may, in addition to transmission of CCMs as illustrated in FIG. 5, also include monitoring of received CCMs as illustrated in FIG. 6. In a step 61 a CCM is received on a monitored network path. In a step 62 it is examined if the received CCM includes an indication bit that indicates presence of a mismatch information element in the CCM. If the received CCM includes the mismatch information element, the mismatch information element is read and compared to the mismatch information element of a corresponding CCM sent on the same network path. The corresponding sent CCM may e.g. be the CCM that was sent most recently prior to reception of the received CCM or the first CCM that is sent after reception of the received CCM. In a step 64 it is determined if the compared mismatch information elements differ, e.g. with respect to traffic status of any working or protection network path or with respect to an identity of a protection group (cf. discussion above regarding a way for detection of mismatch in configured priority for alternate protection segments). If the compared mismatch information elements differ an operator or NMS is notified of a detected mismatch in a step 65.

Figure 7:
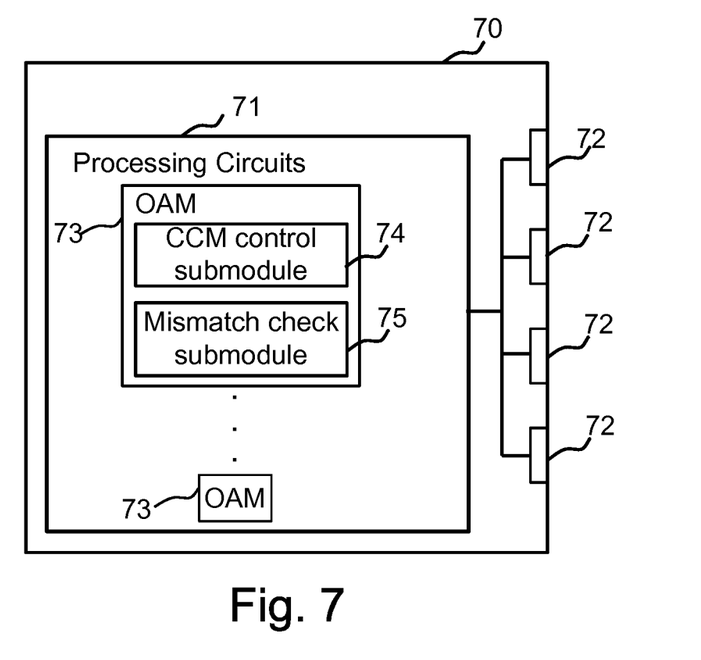
FIG. 7 is a schematic block diagram illustrating an embodiment of a network node for service instance management with support for mismatch detection.

FIG. 7 is a schematic block diagram of an exemplary embodiment 70 of a network node in which the method illustrated in FIGS. 5 and 6 may be carried out. The network node 70 comprises processing circuits 71 and a number of network ports 72 for receiving and transmitting messages on a number of network paths. The processing circuits 71 include a number of Operation, Administration and Management (OAM) entities 73. The above mentioned MEPs 9a-d and 43a-d are examples of OAM entities. The OAM entities are configured to carry out the steps 51-56 of FIG. 5 and the steps 61-65 of FIG. 6. For this purpose the OAM entities 73 may include a CCM control submodule 74 for controlling generation, transmission and reception of CCMs, and a mismatch check submodule 75 configured for detection of mismatches by examination of mismatch information elements of sent and/or received CCMs.

Figure 8:
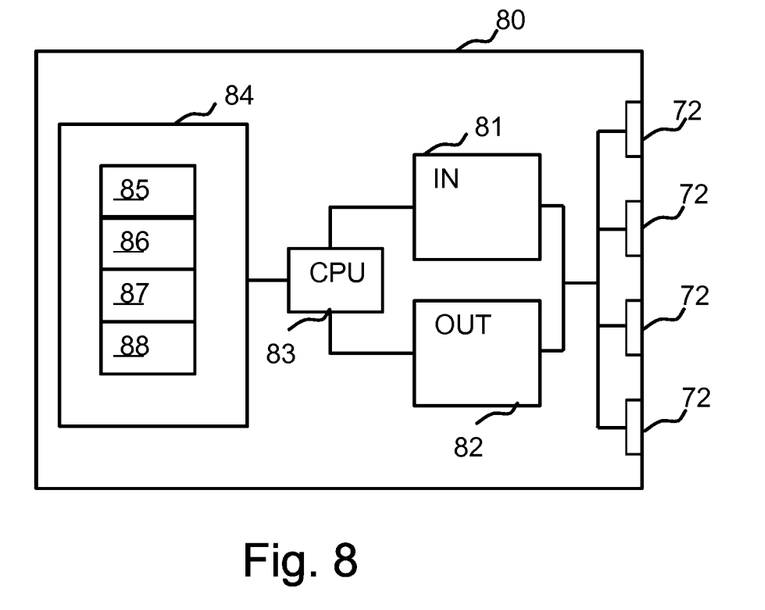
FIG. 8 is a schematic block diagram illustrating an alternative embodiment of a network node for service instance management with support for mismatch detection.

FIG. 8 is a schematic block diagram of another exemplary embodiment 80 of a network node in which the method illustrated in FIGS. 5 and 6 may be carried out. FIG. 8 may be an alternative description of the exemplary embodiment shown in FIG. 7. The network node 80 comprises network ports 72 for receiving and transmitting messages on a number of network paths. The network node 80 also comprises an input unit 81 which is adapted to receive messages from the network paths and an output unit for output of messages on the network paths. The input unit 81 and the output unit 82 may be integrated in hardware of the network node 80. The network node 80 is furthermore provided with a CPU 83, which may be a single unit or composed of several units that are configured to perform steps of procedures described herein. At least one computer program product 84 is included in the UE 22. The computer program product 84 may be embodied in the form of volatile memory or a non-volatile memory, e.g. an EEPROM, a flash memory or a disc drive. The computer program product 84 comprises computer program submodules. FIG. 8 shows a CCM transmission submodule 85 for controlling generation and transmission of CCMs on monitored network paths, mismatch information element submodule 86 for generation of mismatch information elements for inclusion of mismatch information elements in CCMs, a mismatch check module 87 for detection of mismatches by detection of conflicting traffic status in mismatch information elements of sent CCMs, and a mismatch check module 88 for detection of mismatches by comparisons of mismatch information elements of received and transmitted CCMs. The submodules 85-88 essentially perform the steps 51-56 of the flow diagram of FIG. 5 and the steps 61-65 of the flow diagram of FIG. 6. In other words, when the different submodules 85-88 are run on the CPU 83, the network node performs the steps 51-56 of FIG. 5 and the steps 61-65 of FIG. 6. The submodules 85-88 would generally be implemented in software, although implementations completely or partly in firmware, hardware or combinations thereof are also feasible.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for service instance management in a first network node of a communication network, the method comprising monitoring a plurality of bidirectional and distinct network paths for carrying service instances from the first network node to a second network node that form at least two network protection groups, each protection group including at least (A) a working network path which is preferably used for traffic related to the one or more service instances, and (B) a protection network path useable as an alternative for the working network path; and continuously and periodically sending Continuity Check Messages, CCMs, on a monitored network path to the second network node, wherein, in response to occurrence of a predetermined event, an indication bit is included in the CCMs, which are sent on said monitored network path for a predetermined first period of time after the occurrence of said predetermined event, the indication bit indicating presence of a mismatch information element in the CCM that includes the indication bit, wherein, the mismatch information element includes information that specifies, for each protection group that said monitored network path is a member of, a protection group identifier and traffic status of the working network path and of the protection network path of the protection group, wherein said traffic status indicates whether said working network path or said protection network path, respectively, is currently used for the traffic related to the one or more of said service instances.

2. The method according to claim 1, wherein said service instances are backbone services and said monitored network paths are Traffic Engineering Service Instances, TESIs.

3. The method according to claim 1, wherein said service instances are Traffic Engineering Service Instances, TESIs, and said plurality of network paths are Infrastructure Segments.

4. The method according to claim 1, wherein said predetermined event is a state transition in a state machine for controlling traffic status of said plurality of network paths.

5. The method according to claim 1, wherein said mismatch information element is a type-length-value, TLV, element comprising, for each protection group that said monitored network path is a member of, the identity of the protection group, a bit indicating traffic status for said working network path of the protection group and a bit indicating traffic status for said protection network path of the protection group.

6. The method according to claim 1, wherein said first node is a bridge or a switch of an Ethernet network.

7. The method according to claim 1, further comprising detecting a mismatch if at least one of said mismatch information elements, which is included in a sent CCM, specifies conflicting traffic status of the working network path and of the protection network path of at least one protection group; and notifying a Network Management System, NMS, or an operator of the detected mismatch.

8. The method according to claim 1, further comprising receiving a number of CCMs from the second network node; for each received CCM:

reading a mismatch information element from the received CCM, if the received CCM includes an indication bit that indicates presence of the mismatch information element in the received CCM and comparing the mismatch information element of the received CCM with the mismatch information element included in a sent CCM;

detecting a mismatch if the compared mismatch information elements differ during a predetermined second period of time, and notifying a Network Management System, NMS, or an operator of the detected mismatch.

9. The method according to claim 1, wherein at least one of the monitored network paths is a member of two protection groups.

10. A network node for use in a communication network, the network node comprising:

a memory storing instructions; and a processor which, when executing the instructions, is configured to:

monitor a plurality of bidirectional and distinct network paths for carrying service instances from the network node to another network node, wherein said network paths form at least two protection groups, each protection group including at least (A) a working network path which is regularly used for traffic related to the one or more service instances, and (B) a protection network path useable as an alternative for the working network path;

continuously and periodically send Continuity Check Messages, CCMs, on a monitored network path to the other network node; and in response to occurrence of a predetermined event, include an indication bit in the CCMs, which are sent on said monitored network path, for a predetermined first period of time after the occurrence of said predetermined event, the indication bit indicating presence of a mismatch information element in a CCM that includes the indication bit, wherein the mismatch information element includes information that specifies, for each protection group that said monitored network path is a member of, a protection group identifier and traffic status of the working network path and of the protection network path of the protection group, wherein said traffic status indicates whether said working network path or said protection network path is currently used for the traffic related to the one or more of said service instances.

11. The network node according to claim 10, wherein said service instances are backbone services and said monitored network paths are Traffic Engineering Service Instances, TESIs.

12. The network node according to claim 10, wherein said service instances are TESIs and said network paths are Infrastructure Segments.

13. The network node according to claim 10, wherein said predetermined event is a state transition in a state machine for controlling traffic status of said plurality of network paths.

14. The network node according to claim 10, wherein said mismatch information element is a type-length-value, TLV, element comprising, for each protection group that said monitored network path is a member of, the identity of the protection group, a bit indicating traffic status for said working network path of the protection group and a bit indicating traffic status for said protection network path of the protection group.

15. The network node according to claim 10, wherein said network node is a bridge or a switch of an Ethernet network.

16. The network node according to claim 10, wherein said OAM entities are further configured to detect a mismatch if at least one of said mismatch information elements, which is included in a sent CCM, specifies conflicting traffic status of the working network path and of the protection network path of at least one protection group; and to notify a Network Management System, NMS, or an operator of the detected mismatch.

17. The network node according to claim 10, wherein said OAM entities are further configured to receive a number of CCMs from the other network node;

for each received CCM: read a mismatch information element from the received CCM, if the received CCM includes an indication bit that indicates presence of the mismatch information element in the received CCM and compare the mismatch information element of the received CCM with the mismatch information element included in a sent CCM;

detect a mismatch if the compared mismatch information elements differ during a predetermined second period of time, and to notify a Network Management System, NMS, or an operator of the detected mismatch.

18. The network node according to claim 10, wherein each of said OAM entities monitors one protection group.

19. A method for service instance management in a first network node of a communication network, the method comprising:

monitoring a plurality of bidirectional and distinct network paths that carry service instances from the first network node to a second network node, said network paths forming at least two network protection groups associated with one or more of said service instances, each protection group including (A) a working network path which is preferably used for traffic related to the one or more service instances, and (B) a protection network path useable as an alternative for the working network path; and for a predetermined first period of time after a predetermined event occurs, sending a message on one of the monitored network paths, the message including a mismatch information element that specifies, for each protection group that said one of the monitored network paths is a member of, a protection group identifier and traffic status of the working network path and of the protection network path of that protection group.

* * * * *